US 12,123,784 B2

(12) United States Patent
Libeer et al.

(10) Patent No.: US 12,123,784 B2
(45) Date of Patent: Oct. 22, 2024

(54) TEMPERATURE SENSING SYSTEMS AND METHODS FOR AN ELECTRONIC DEVICE

(71) Applicant: Apple Inc., Cupertino, CA (US)

(72) Inventors: William B. Libeer, Santa Clara, CA (US); Chunwei Yu, Saratoga, CA (US); Judith C. Segura, San Francisco, CA (US); Mei Li, Santa Clara, CA (US); Xiangfei Yu, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/658,882

(22) Filed: Apr. 12, 2022

(65) Prior Publication Data

US 2022/0333998 A1    Oct. 20, 2022

Related U.S. Application Data

(60) Provisional application No. 63/176,007, filed on Apr. 16, 2021.

(51) Int. Cl.
*G01K 1/08* (2021.01)
*G01K 7/02* (2021.01)
*G01K 7/16* (2006.01)
*G01K 7/22* (2006.01)

(52) U.S. Cl.
CPC ............... *G01K 1/08* (2013.01); *G01K 7/02* (2013.01); *G01K 7/16* (2013.01); *G01K 7/22* (2013.01)

(58) Field of Classification Search
CPC ............... G01K 1/08; G01K 7/22; G01K 7/16
See application file for complete search history.

(56) References Cited

U.S. PATENT DOCUMENTS

| | | | |
|---|---|---|---|
| 9,909,930 B2 | 3/2018 | Zivkovic et al. | |
| 2014/0355649 A1 | 12/2014 | Niederberger et al. | |
| 2015/0276509 A1 | 10/2015 | Carbone et al. | |
| 2016/0146678 A1 * | 5/2016 | Kalyanasundaram | ... G01K 7/42 374/152 |
| 2018/0136051 A1 | 5/2018 | Ishii | |
| 2021/0004065 A1 | 1/2021 | Chandra et al. | |

FOREIGN PATENT DOCUMENTS

| | | | | | |
|---|---|---|---|---|---|
| CN | 104236736 A | * | 12/2014 | ............... | G01K 7/42 |
| CN | 105607466 A | * | 5/2016 | | |
| EP | 2963402 A1 | * | 1/2016 | ............... | G01K 1/20 |
| JP | 2013108801 A | | 6/2013 | | |
| JP | 2018081467 A | | 5/2018 | | |
| JP | 2019029141 A | | 2/2019 | | |
| JP | 2019090616 A | | 6/2019 | | |
| JP | 2021012078 A | | 2/2021 | | |
| WO | WO-2015026549 A1 | * | 2/2015 | ......... | G05D 23/1917 |

OTHER PUBLICATIONS

European Search Report for EP Application No. 22168254.5, mailed Sep. 9, 2022 (5 pp.).

* cited by examiner

*Primary Examiner* — Mirellys Jagan
(74) *Attorney, Agent, or Firm* — Dorsey & Whitney LLP

(57) ABSTRACT

A portable electronic device can include a housing at least partially defining an internal volume, a set of temperature sensors disposed in the internal volume, a display assembly, and a processor or main logic board. The set of temperature sensors can be positioned adjacent to or affixed to components of the portable electronic device. The processor can determine a temperature of an environment based on an adjustment factor and weighted temperature measurements taken by a subset of the set of temperature sensors.

20 Claims, 8 Drawing Sheets

TEMPERATURE SENSING SYSTEMS AND METHODS FOR AN ELECTRONIC DEVICE

CROSS-REFERENCE TO RELATED APPLICATION(S)

This claims the benefit of U.S. Provisional Patent Application No. 63/176,007, filed Apr. 16, 2021, entitled "TEMPERATURE SENSING SYSTEMS AND METHODS FOR AN ELECTRONIC DEVICE," the entire disclosure of which is hereby incorporated by reference.

FIELD

The described embodiments relate generally to temperature sensing. More particularly, the present embodiments relate to temperature sensing using one or more portable electronic devices.

BACKGROUND

Electronic devices are increasingly being designed with device portability in mind, for example, to allow users to use these devices in a wide variety of situations and environments. Indeed, power sources, such as lithium batteries, can power an electronic device for a substantial duration of time and in a variety of indoor and outdoor environments. Components within an electronic device, such as, a processor, memory, antennas, and other components, can be sealed within a housing to protect the components from damage or failure induced by an environment external to the housing. Improvements and advances to portable electronic devices can be desirable to provide additional functionality in a variety of situations and environments.

SUMMARY

According to some aspects of the present disclosure, a portable electronic device can include a housing defining an internal volume, a display assembly, a set of temperature sensors disposed in the internal volume, and a processor disposed in the internal volume. The processor can be connected to the set of temperature sensors and can be configured to determine an environment external to the housing. The processor can also determine an adjustment factor correlating to the environment. The processor can also select a first sensor and a second sensor from the set of temperature sensors. The processor can also assign a first weight to a first signal provided by the first sensor to generate a first weighted signal. The processor can also assign a second weight to a second signal provided by the second sensor to generate a second weighted signal. The processor can also determine a temperature of the environment based on the adjustment factor and the first and second weighted signals.

In some examples, the first and second sensors are selected from the set of temperature sensors based on the determined environment. The first and second signals can include temperature measurements of respective regions surrounding the first and second sensors. The first sensors can be positioned adjacent a first internal component, and the second sensor can be positioned adjacent a second internal component. A magnitude of the first weight can be based on at least one of the environment, the first signal, or the position of the first sensor within the internal volume. A magnitude of the second weight can be based on at least one of the environment, the second signal, or the position of the second sensor within the internal volume. At least one of the first or second sensors can be a thermistor. At least one of the first or second sensors can be affixed to the display assembly. The environment can be one of ambient air at least partially surrounding the portable electronic device, or water at least partially surrounding the portable electronic device. The portable electronic device can be one of a smartwatch, a smartphone, or a tablet computing device.

According to some examples, an electronic device can include a housing defining an internal volume, a set of temperature sensors disposed in the internal volume, and a processor disposed in the internal volume. The processor can be connected to the set of temperature sensors and can be configured to select a first subset of the sensors of the set of temperature sensors. The processor can also apply a respective weight to each of temperature detected by the first subset of sensors to generate weighted temperatures. The processor can also select a first adjustment factor correlating to a predicted environment external to the housing. The processor can also determine a first predicted temperature of the predicted environment based on the first adjustment factor and the weighted temperatures.

In some examples, the processor can also be configured to evaluate the first predicted temperature and, based on the evaluation, select a second subset of sensors of the set of temperature sensors; apply a respective weight to each temperature detected by the second subset of sensors to generate alternate weighted temperatures; and determine a second predicted temperature of the environment based on the first adjustment factor and the alternate weighted temperatures. Alternatively, based on the evaluation, the processor can confirm the predicted temperature based on the first subset of sensors.

In some examples, the processor can also be configured to evaluate the first predicted temperature and, based on the evaluation, select a second adjustment factor correlating to the predicted environment external to the housing, and determine a second predicted temperature of the environment based on the second adjustment factor and the weighted temperatures. Alternatively, based on the evaluation, the processor can confirm the predicted temperature based on the first subset of sensors.

In some examples, the processor can also be configured to evaluate the first predicted temperature and, based on the evaluation, select a second subset of sensors of the set of temperature sensors; apply a respective weight to each temperature detected by the second subset of sensors to generate alternate weighted temperatures; select a second adjustment factor correlating to the predicted environment external to the housing; and determine a second predicted temperature of the environment based on the second adjustment factor and the alternate weighted temperatures. Alternatively, based on the evaluation, the processor can confirm the predicted temperature based on the first subset of sensors.

In some examples, a magnitude of the respective weight is based on at least one of the predicted environment, a temperature detected by each respective sensor of the first subset of sensors, or respective positions within the internal volume of each sensor of the first subset of sensors. The predicted environment can be one of ambient air at least partially surrounding the electronic device or water at least partially surrounding the electronic device. At least one of the respective weights or the first adjustment factor can be at least partially based on calibration data communicated to the processor by an ancillary electronic device. The ancillary electronic device can be a smart thermostat, a smartphone, a smartwatch, or a tablet computing device. The ancillary electronic device can be a first ancillary electronic device, and the processor can be configured to receive calibration data from the first ancillary electronic device and a second ancillary electronic device.

According to some aspects, an electronic device can include a housing at least partially defining an internal volume, a first electrical component disposed in the internal volume, a first temperature sensor, a second electrical component disposed in the internal volume, a second temperature sensor, and a process connected to the first and second temperature sensors. The first temperature sensor can be positioned proximate to the first electrical component and can be configured to measure a temperature at the first electrical component. The second temperature sensor can be positioned proximate to the second electrical component and configured to measure a temperature at the second electrical component. The processor can be configured to determine a temperature off an environment external to the housing based on an adjustment factor and the temperatures measured by the first and second temperature sensors.

In some examples, each of the first and second temperature sensors can be one of negative temperature coefficient thermistor, a positive temperature coefficient thermistor, a resistance temperature detector, or a thermocouple. The electronic device can also include an electrical power supply. The temperature proximate to the first electrical component can increase while the first electrical component is being supplied electrical power by the electrical power supply. The first electrical component can be a display assembly, a battery, a speaker, or an antenna.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
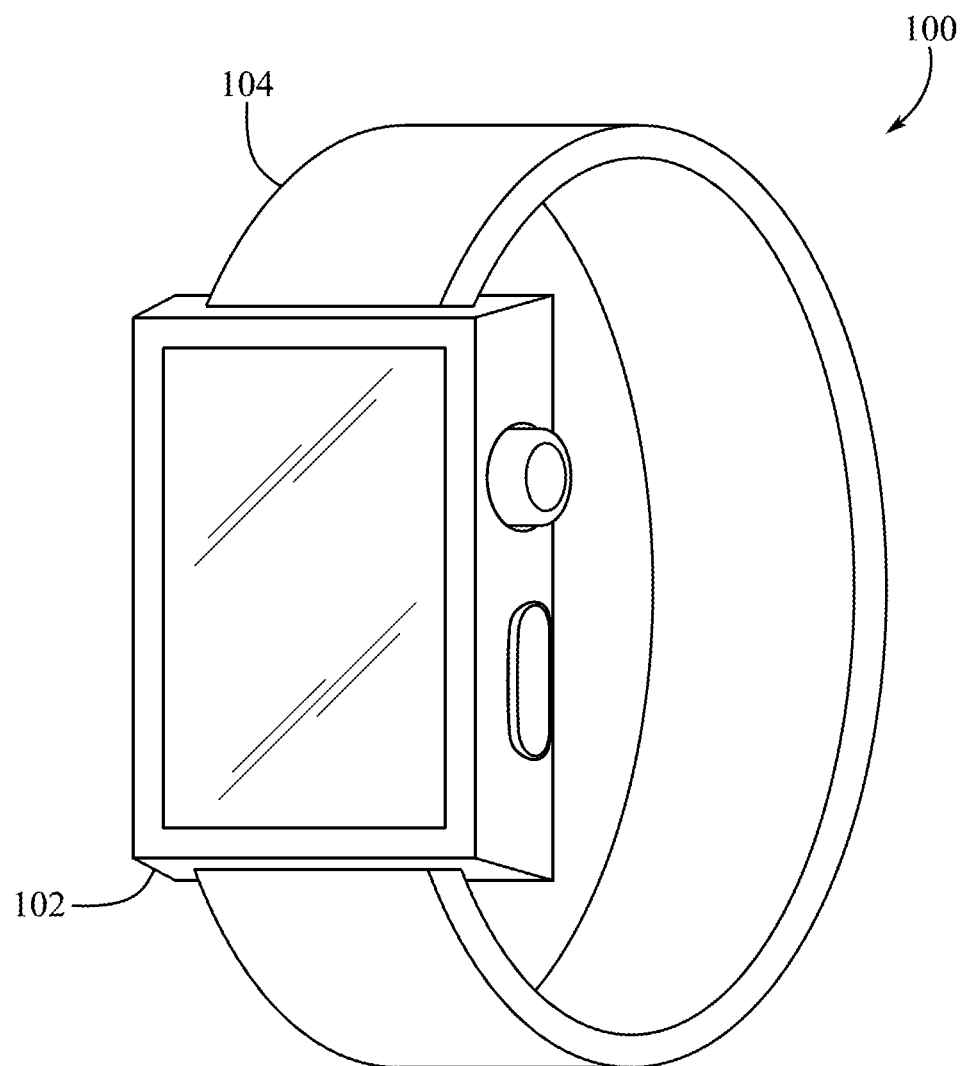
FIG. 1A shows a perspective view of an electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to an electronic device which can utilize one or more temperature sensors disposed within the electronic device to estimate or predict a temperature of an environment surrounding the electronic device. Each of the one or more temperature sensors can be disposed on or adjacent a component within the electronic device, and can be utilized to monitor an operating temperature of that component. For example, a temperature sensor can be disposed on a main logic board or processor of the electronic device to monitor an operating temperature of the processor. In one aspect of the present disclosure, the temperature measurements taken by the temperature sensor to monitor the operating temperature of the component (e.g., a processor) can also be utilized to estimate the temperature of the external environment (i.e., external to the housing of the electronic device). Thus, a single measurement taken by a sensor can be utilized to determine a temperature proximate to the sensor as well as a temperature external to the electronic device.

In some examples, determining the temperature of the external environment can be beneficial to a wearer or user of the electronic device. For example, a swimmer can desire to know a water temperature in which the swimmer is exercising because the temperature of the water can significantly impact the number of calories the swimmer burns while exercising. The same is true for hiking, bicycling, and many other physical activities.

In some examples, a data set or a database can be compiled which contains data representative of numerous attributes of the electronic device. For example, the data set can contain a quantity of sensors and the respective position of each sensor within the electronic device. The data set can also include a respective temperature measurement for each of the sensors and an external environment temperature at the time when the respective temperature measurements were taken. Machine learning techniques can be used to correlate or compare the data set to types of environments (arid, humid, aqueous, etc.) and the temperature of those environments to generate models which best or most accurately predict a temperature of the external environment based on the temperatures measured within the electronic device. In other words, adjustment factors and scalers can be applied to temperatures measured by the one or more temperature sensors internal to the electronic device to determine a temperature of an environment external to the electronic device. For example, machine learning can determine which combinations of sensors measurements, weights, and adjustment factors best or most accurately estimate the temperature of the environment external to the electronic device.

In some examples, the electronic device can be portable and can include a housing that defines an internal volume. The electronic device can include a set of temperature sensors disposed within the internal volume. The electronic device can include a processor or main logic board disposed within the internal volume and connected to the set of temperature sensors. In some examples, the processor can determine a type of environment external to the housing and determine an adjustment factor correlating to the type of environment. The processor can select a first sensor and a second sensor from the set of available temperature sensors. The processor can assign a first weight to a first signal provided by the first temperature sensor to generate a first weighted signal. The processor can assign a second weight to a second signal provided by the second temperature sensor to generate a second weighted signal. As described herein, the processor can determine a temperature of the environment based on the adjustment factor and the first and second weighted signals.

These and other embodiments are discussed below with reference to FIGS. 1A-5. However, those skilled in the art will readily appreciate that the detailed description given herein with respect to these Figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1A shows an example of an electronic device 100. The electronic device 100 shown in FIG. 1A is a watch, such as a smartwatch. The smartwatch of FIG. 1A is merely one representative example of a device that can be used in conjunction with the systems and methods disclosed herein. Electronic device 100 can correspond to any form of wearable electronic device, a portable media player, a media storage device, a portable digital assistant ("PDA"), a tablet computer, a computer, a mobile communication device, a GPS unit, a remote control device, a smart watch, a smart phone, or other electronic device. The electronic device 100 can be referred to as an electronic device, or a consumer device. In some examples, the electronic device 100 can include a housing 102 that can carry operational components, for example, in an internal volume at least partially defined by the housing 102. The electronic device 100 can also include a strap 104, or other retaining component that can secured the device 100 to a body of a user, as desired. Further details of the electronic device are provided below with reference to FIG. 1B.

Figure 1B:
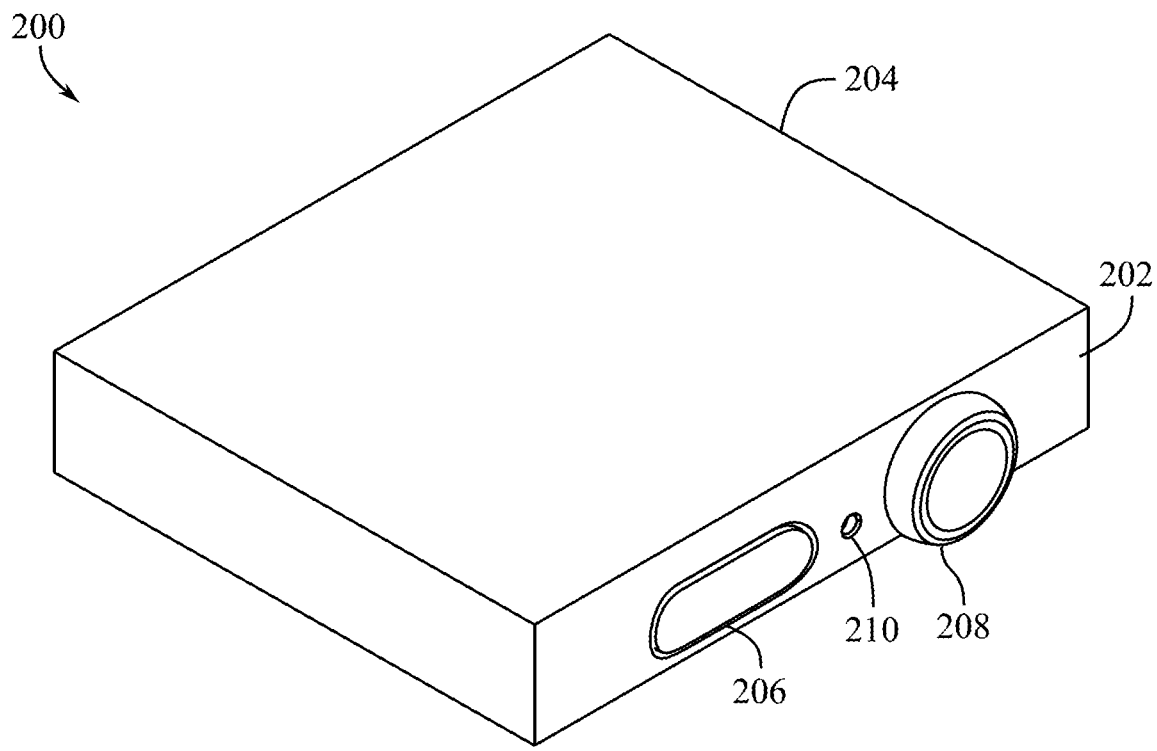
FIG. 1B shows a top perspective view of an electronic device.

FIG. 1B illustrates a device 200, such as, a smartwatch that can be substantially similar to, and can include some or all of the features of the devices described herein, such as electronic device 100. The device 200 can include a housing 202, and a display assembly 204 attached to the housing 202. The housing 202 can substantially define at least a portion of an exterior surface of the device 200.

The display assembly 204 can include a glass, a plastic, or any other substantially transparent exterior layer, material, component, or assembly. The display assembly 204 can include multiple layers, with each layer providing a unique function, as described herein. Accordingly, the display assembly 204 can be, or can be a part of, an interface component. The display assembly 204 can define a front exterior surface of the device 200 and, as described herein, this exterior surface can be considered an interface surface. In some examples, the interface surface defined by display assembly 204 can receive inputs, such as touch inputs, from a user.

In some examples, the housing 202 can be a substantially continuous or unitary component and can define one or more openings to receive components of the electronic device 200. In some examples, the device 200 can include input components such as one or more buttons 206 and/or a crown 208 that can be disposed in the openings. In some examples, a material can be disposed between the buttons 206 and/or crown 208 and the housing 202 to provide an airtight and/or watertight seal at the locations of the openings. The housing 202 can also define one or more openings or apertures, such as aperture 210 that can allow for sound to pass into or out of the internal volume defined by the housing 202. For example, the aperture 210 can be in communication with a microphone component disposed in the internal volume.

Figure 1C:
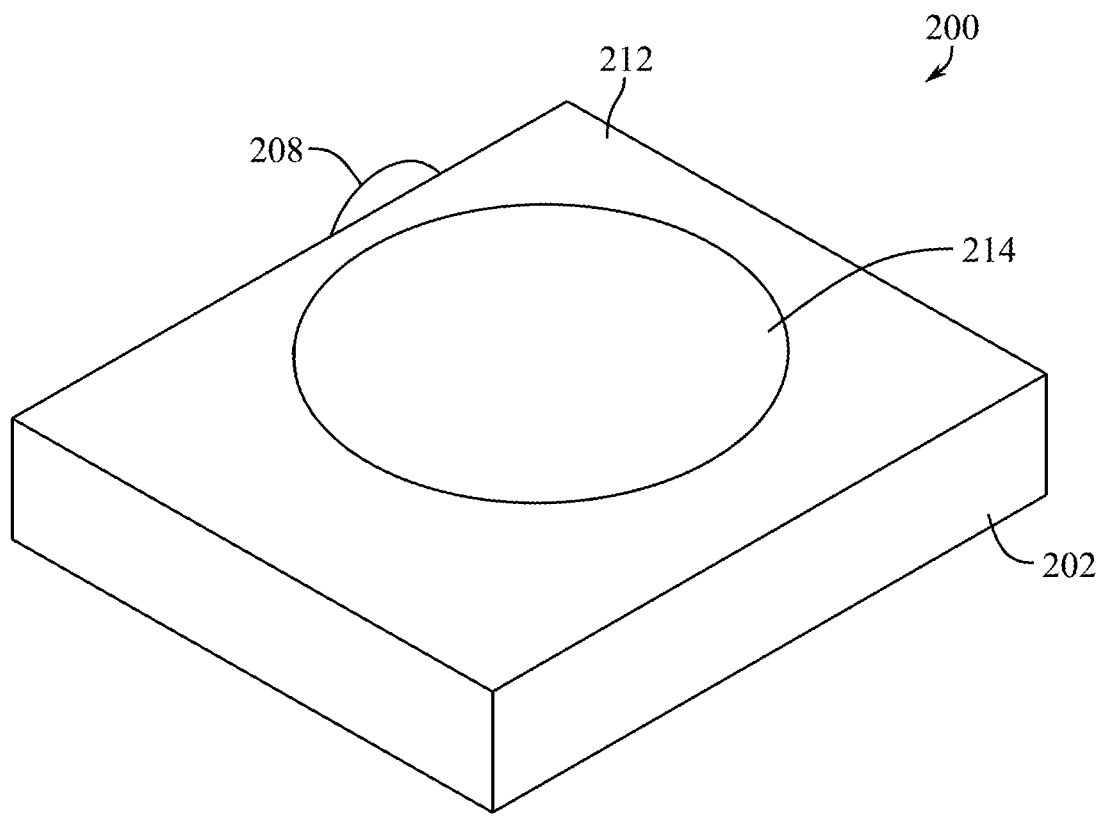
FIG. 1C shows a bottom perspective view of an electronic device.

FIG. 1C shows a bottom perspective view of the electronic device 200. The device 200 can include a back cover 212 that can be attached to the housing 202, for example, opposite the display assembly 204. The back cover 212 can include ceramic, plastic, metal, or combinations thereof. In some examples, the back cover 212 can include an at least partially electromagnetically transparent component 214. The electromagnetically transparent component 214 can be transparent to any desired wavelengths of electromagnetic radiation, such as visible light, infrared light, radio waves, or combinations thereof. In some examples, the electromagnetically transparent component 214 can allow sensors and/or emitters disposed in the housing 202 to communicate with the external environment. Together, the housing 202, display assembly 204 and back cover 212 can substantially define an internal volume and an external surface of the device 200.

Figure 1D:
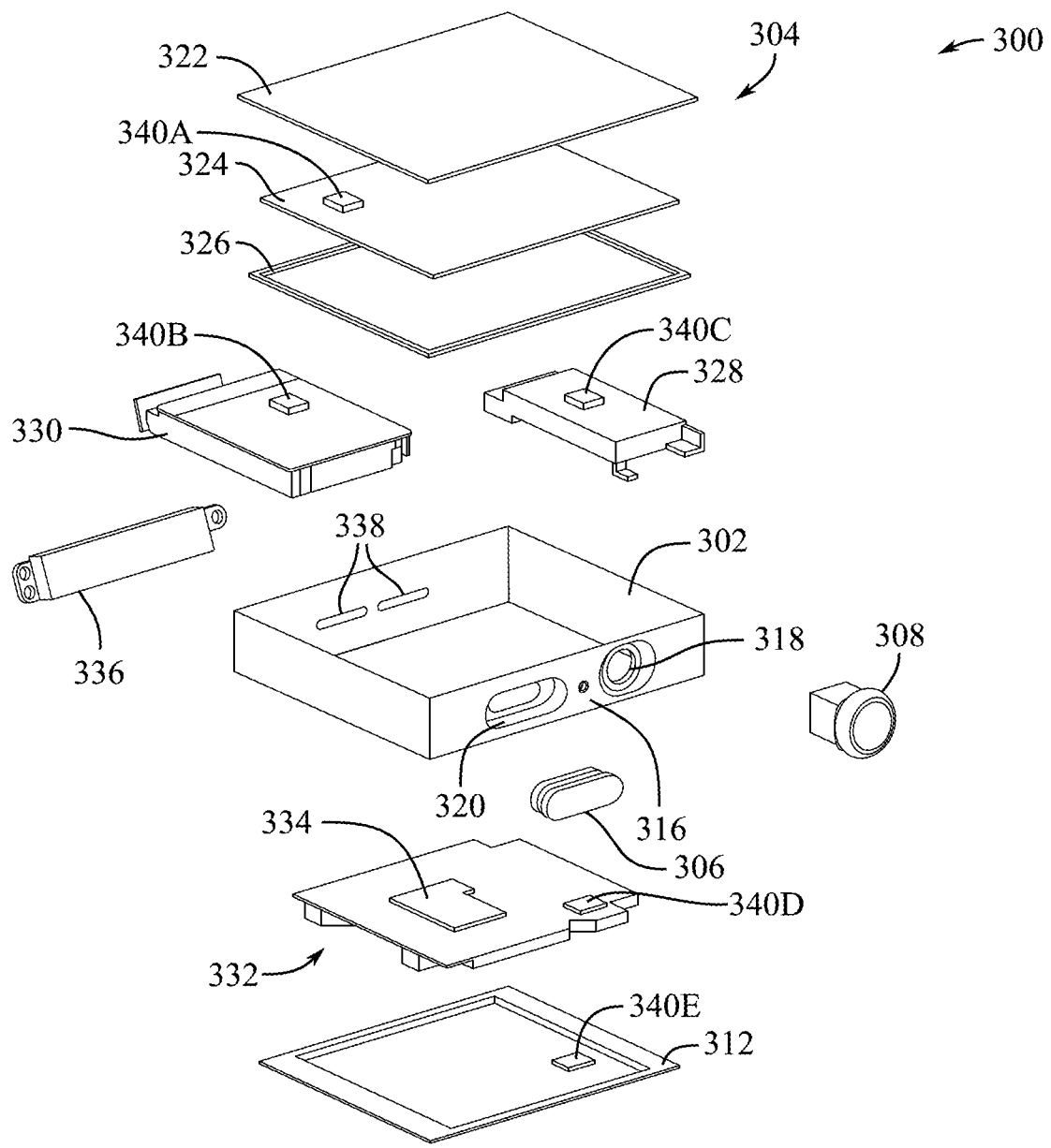
FIG. 1D shows an exploded view of an electronic device.

FIG. 1D illustrates an exploded view of an electronic device 300, such as, a smartwatch that can be substantially similar to, and can include some or all of the features of the devices described herein, such as electronic devices 100 and 200. The electronic device 300 can include a housing 302, a display assembly 304, and a back cover 312. Together, the housing 302, display assembly 304, and back cover 312 can define an exterior surface and an internal volume of the electronic device 300.

The housing 302 can be a substantially continuous or unitary component, and can define one or more openings 316, 318, 320 to receive components of the electronic device 300 and/or to provide access to an internal portion of the electronic device 300. In some examples, the electronic device 300 can include input components such as one or more buttons 306 and/or a crown 308 that can be disposed in the openings 320, 318. A microphone (not shown) can be disposed in the internal volume in communication with the external or ambient environment through the opening 316.

The display assembly 304 can be received by, and can be attached to, the housing 302. The display assembly 304 can include a cover 322 including a transparent material, such as plastic, glass, and/or ceramic. The display assembly 304 can also include a display assembly 324 that can include multiple layers and components, each of which can perform one or more desired functions. For example, the display assembly 324 can include a layer that can include a touch detection layer or component, a force sensitive layer or component, and one or more display layers or components that can include one or more pixels and/or light emitting portions to display visual content and/or information to a user. In some examples, the display layer or component can include a liquid crystal display (LCD), a light emitting diode (LED) display, an organic light emitting diode (OLED) display, and/or any other form of display. The display layer can also include one or more electrical connectors to provide signals and/or power to the display layer from other components of the electronic device 300.

In some examples, the electronic device 300 can include a gasket or seal 326 that can be disposed between the display assembly 304 and the housing 302 to substantially define a barrier to the ingress of liquids or moisture into the internal volume from the external environment at the location of the seal 326. As described herein, the seal 326 can include polymer, metal, and/or ceramic materials. The electronic device 300 can also include a similar seal (not shown) that can be disposed between the housing 302 and the back cover 312 to substantially define a barrier to the ingress of liquids or moisture into the internal volume from the external environment at the location of the seal. As described herein, the seal can include polymer, metal, and/or ceramic materials. The seal can be substantially similar to, and can include, some or all of the features of the seal.

The electronic device 300 can also include internal components, such as a haptic engine 328, an electrical power supply 330 (e.g., a battery), a speaker module 336, and a logic board 332, also referred to as a main logic board 332 that can include a system in package (SiP) 334 disposed thereon, including one or more integrated circuits, such as processors, sensors, and memory. The SiP 334 can also include a package.

In some examples, internal components can be disposed below the main logic board 332 and can be disposed at least partially in a portion of the internal volume defined by the back cover 312. In some examples, the electronic device 300 can include one or more wireless antennas (not shown) that can be in electrical communication with one or more other components of the electronic device 300. In some examples, the antenna(s) can receive and/or transmit wireless signals at one or more frequencies and can be, for example, one or more of a cellular antenna such as an LTE antenna, a Wi-Fi antenna, a Bluetooth antenna, a GPS antenna, a multifrequency antenna, and the like. The antenna(s) can be communicatively coupled to one or more additional components of the electronic device 300.

The main logic board 332 can determine an environment external to the housing 302 of the electronic device 300. The environment (i.e., a type of environment) can be determined to be an atmospheric or arid environment, such as, while a user of the electronic device 300 is lounging in a chair on a beach. Alternatively, the determined environment can be aqueous, for example, when the user enters a body of water such as an ocean, lake, or pool and the electronic device 300 is temporarily submerged under water. The main logic board 332 can determine the type of environment by any technology currently available or otherwise developed in the future. For example, the electronic device 300 can include one or more components which measure or detect characteristics of the environment based on location information (i.e., GPS data), pressure detection, spectroscopy, moisture detection, or a combination thereof.

In some examples, the electronic device 300 can include a speaker assembly 336 disposed within the housing 302. The speaker assembly 336 can include one or more speakers which convert electrical signals into acoustic waves audible at an environment external to the housing 302. For example, one or more apertures 338 can formed within the housing 302 which place the speaker assembly in fluid communication with the environment external to the housing 302. The internal components can be disposed within the internal volume defined at least partially by the housing 302, and can be affixed to the housing 302 via adhesives, internal surfaces, attachment features, threaded connectors, studs, posts, or other features, that are formed into, defined by, or otherwise part of the housing 302 and/or the back cover 312.

The electronic device 300 can include additional components such as one or more sensors 340A-E which detect a temperature of a space immediately surrounding the respective sensor. The one or more sensors 340A-E can be a negative temperature coefficient thermistor (NTC), a positive temperature coefficient thermistor (PTC), a resistance temperature detector, a thermocouple, a combination thereof, or any other sensor capable of detecting a temperature of a space immediately surrounding the sensor. In some examples, as shown in FIG. 1D, the one or more sensors 340A-E can be positioned on or adjacent one or more of the components of the electronic device 300. In other words, each of the one or more sensors 340A-E can be affixed, adhered, fastened, or otherwise coupled to a component of the electronic device 300. As such, the respective temperature detected by each sensor 340 can be influenced or otherwise altered by operation of the component to which the sensor 340 is affixed. For example, a sensor 340D can be affixed to the logic board 332 and detect a relatively higher temperature than a temperature detected by a sensor 340A affixed to the display assembly 324 because the logic board 332 can generate heat while operating. While the sensors 340A-E illustrated in FIG. 1D are shown as coupled to components within the internal volume of the housing 302 (e.g., display assembly 304, back cover 312, a main logic board 332, etc.), those having skill in the art will readily appreciate that one or more sensors can additionally, or alternatively, be affixed external to the housing (e.g., on an external surface of the housing 302). The sensors 340A-E can be communicatively coupled to the main logic board 332 or another component having a processor within the electronic device 300. For example, one or more of the sensors 340A-E can be coupled to the main logic board 332 through a wired communication path or a wireless communication path.

While the respective temperatures measured by the sensors 340A-E may not be equivalent to a temperature of the environment external to the housing 302, the main logic board 332 can nonetheless rely on one or more of the respective temperature measurements from the sensors 340A-E to determine or approximate the temperature of the environment external to the housing 302. In other words, the main logic board 332 can determine or approximate the temperature of the environment external to the housing 302 based at least partially on temperature measurements taken from one or more locations within the housing 302. Thus, the respective temperature measurements collected by the sensors 340A-E can be utilized for multiple purposes (e.g., to determine a temperature surrounding the sensor 340 and determine a temperature external to the housing 302). Determining a temperature of the environment external to the electronic device 300 can be beneficial, for example, when a user is undertaking an exercise and desires to know the temperature of the environment (e.g., swimming, scuba-diving, snorkeling, etc.).

In some examples, the main logic board 332 can rely on an equation to determine or approximate the temperature of the environment external to the housing. The equation can include two or more weighted temperature measurements from respective sensors 340 and an adjustment factor or offset based on the environment external to the housing 302. In other words, the temperature of the environment external to the housing can be determined or approximated by an equation having n-terms, where n represents two or more weighted temperature measurements from respective sensors 340. Each of the n-terms can correlate to at least one weighted temperature measurement collected by one or more of the sensors 340. In some examples, the Equation 1 shown below can be utilized to determine the temperature of the environment external to the housing 302.

$$T_E = -A \pm (B*(VALUE:S_n)) + (C*(VALUE:S_m)) \quad \text{EQUATION 1:}$$

The term $T_E$ in Equation 1 can represent the temperature of the environment external to the housing 302. The term A in Equation 1 can represent the adjustment factor or offset correlating to the environment determined by the main logic board 332. The term VALUE:$S_n$ can represent the temperature measurement taken by a particular sensor of the sensors 340A-E. The term B in Equation 1 can represent a weight or scaler applied to the temperature measurement taken by the particular sensor (i.e., the sensor represented by the term $S_n$). The term VALUE:$S_m$ can represent the temperature measurement taken by another particular sensor of the sensors 340A-E. The term C in Equation 1 can represent a weight or scaler applied to the temperature measurement taken by the other particular sensor (i.e., the sensor represented by the term $S_m$). It will be readily understood, that Equation 1 can include additional weights or scalers modifying additional temperature measurements taken by additional sensors.

The adjustment factor A can be applied to a summation of the weighted temperature values to predict or estimate a temperature of the external environment. The adjustment factor A can be at least partially based on the particular environment surrounding the electronic device 300. For example, the adjustment factor A can have a respective magnitude or value when the electronic device 300 is surrounded by a dry or arid environment and a different magnitude or value when the portable electronic device is surrounded by a humid or aqueous environment (e.g., submerged in water). The magnitude or size of the adjustment factor A can be selected based on heat transfer characteristics or any other properties of the electronic device 300 and/or the environment.

In some examples, the adjustment factor A can be correlated or at least partially relate to the environment (or type of environment) external to the electronic device 300. The variance between the magnitudes of adjustment factors A in different environments can be based on the way the environment interacts with the one or more of the components of the electronic device 300. For example, a magnitude of the adjustment factor A can be relatively smaller when the electronic device is submerged under water because the heat within the housing 302 can be transferred to water at a higher rate. Conversely, a magnitude of the adjustment factor A can be relatively larger when the electronic device is disposed within an arid environment because less of the heat within the housing 302 is transferred to the air surrounding the device. In some examples, the adjustment factor can be negative or otherwise subtracted from the summation of the weighted temperatures to, for example, offset heat generated by electrical components disposed within the electronic device.

The respective weights B and C applied to the measurements or signals of the sensors $S_n$, $S_m$ can be scalers having values or magnitudes which modify the measurements or signals to enable a best or most accurate determination of the predicted or estimated temperature of the environment surrounding the electronic device 300. In some examples, the weight B can be different from the weight C, for example, the weight B can be larger or greater than the weight C.

In some examples, only a subset of the sensors 340A-E can be relied on to collect the temperature values (e.g., VALUE:$S_n$, and VALUE:$S_m$) within Equation 1. For example, the respective temperature measurements or signals of the sensor 340A and the sensor 340E can be utilized within Equation 1. In some examples, the temperature measurements or signals of more than two of the sensors, or fewer than two of the sensors, can be utilized to predict or estimate the temperature of the environment external to the electronic device 300. In other words, any number of the sensors 340A-E or subsets of the sensors 340A-E can be utilized to predict or estimate the temperature of the environment external to the electronic device 300. Furthermore, each of the temperature measurements or signals of the two, more, or fewer sensors can be individually weighted to predict or estimate the temperature of the environment external to the electronic device 300.

In some examples, a data set or database can be formed which contains data representative of numerous adjustment factors, weights, sensor positions within the electronic device, and temperature measurements of the sensors. Machine learning techniques can be used to correlate or compare the data set to types of environments (arid, humid, aqueous, etc.) and the temperature of those environments to generate models which best or most accurately predict a temperature of the environment. These machine learning techniques can be incorporated during assembly and/or manufacture of the electronic device, and can be adjusted or tuned for each device. The data set or database can be stored on a local or remote computer, or server, and each generated model can be uploaded from the assembly devices or test structures to the processor and memory of each electronic device. For example, machine learning can determine which combinations of sensors 340A-E measurements (e.g., VALUE:$S_n$, and VALUE:$S_m$), weights (e.g., weights B and C), and adjustment factors (e.g., adjustment factor A) best or most accurately estimate the temperature of the environment external to the electronic device 300. Thus, after the type of environment is determined (e.g., arid, humid, aqueous), a best or most accurate model (e.g., combination of sensors values, weights, and an adjustment factor) correlating to that type of environment can be used to project, estimate, or predict a temperature of the particular external environment.

The type of environment can be determined by any method or mechanism now known or developed in the future. For example, one or more infrared sensors, humidity sensors, or other sensors can be communicatively coupled to the main logic board 332 to determine the type of environment surrounding the electronic device 300. Two non-limiting examples of types of environment are described below with reference to FIGS. 2A and 2B.

Figure 2A:
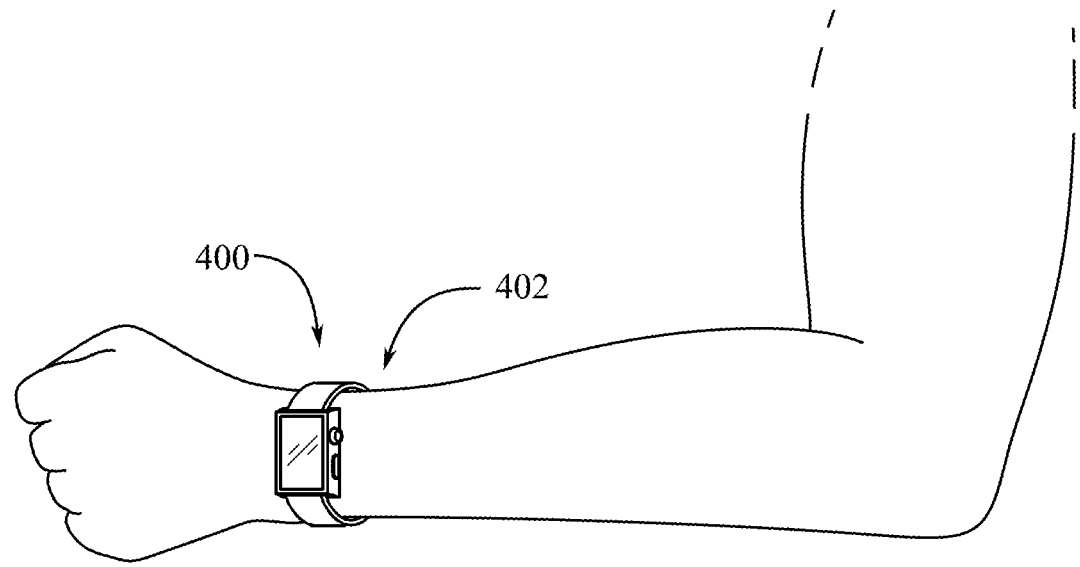
FIG. 2A shows a perspective view of an electronic device in an environment.
Figure 2B:
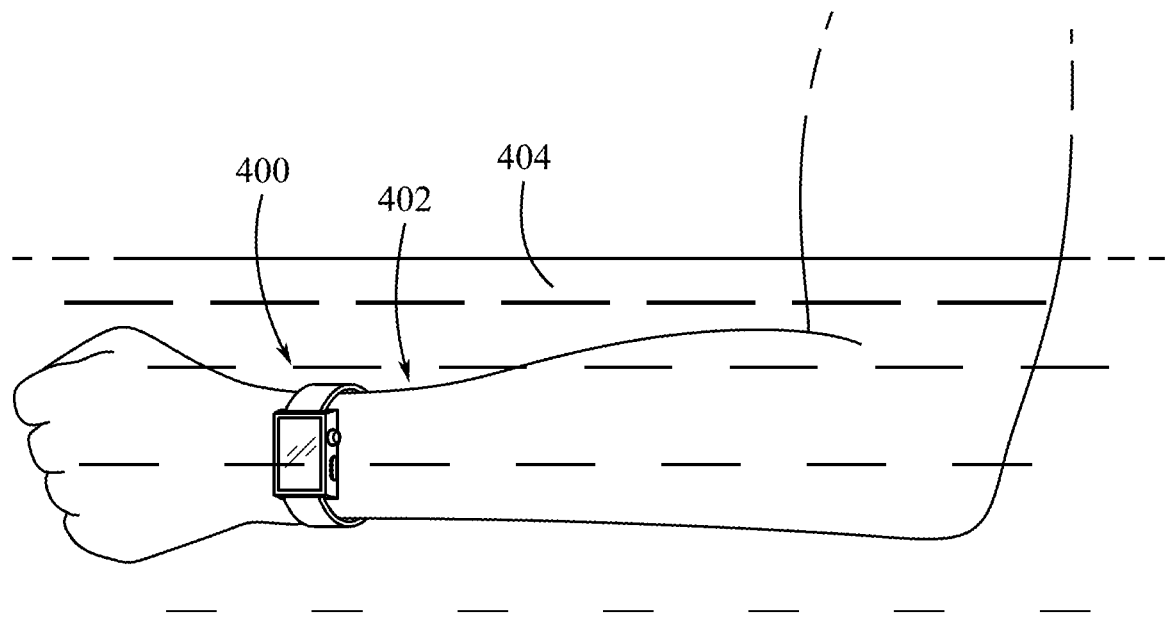
FIG. 2B shows a perspective view of an electronic device in an environment.

FIGS. 2A and 2B show a side perspective view of an electronic device 400 disposed within a first type of environment and a second type of environment, respectively. The electronic device 400 is illustrated as a smartwatch coupled to a wrist 402 of the wearer. However, the electronic device 400 can be any electronic device including a smartphone, a tablet computer, or another portable electronic device in other examples. The first type of environment can be an arid or a relatively dry environment wherein the electronic device 400 is exposed to relatively little moisture (e.g., a beach). The second type of environment can be an aqueous environment wherein the electronic device 400 is submerged within a liquid 404 (e.g., swimming in the ocean). One or more sensors of the electronic device 400 can determine the type of environment surrounding the electronic device 400. While only the first and second environments are described herein, alternative and/or additional types of environments are also within the scope of the present disclosure. For example, a sauna, steam room, shower, or other types of environments can also be determined or identified by the electronic device 400.

Figure 3A:
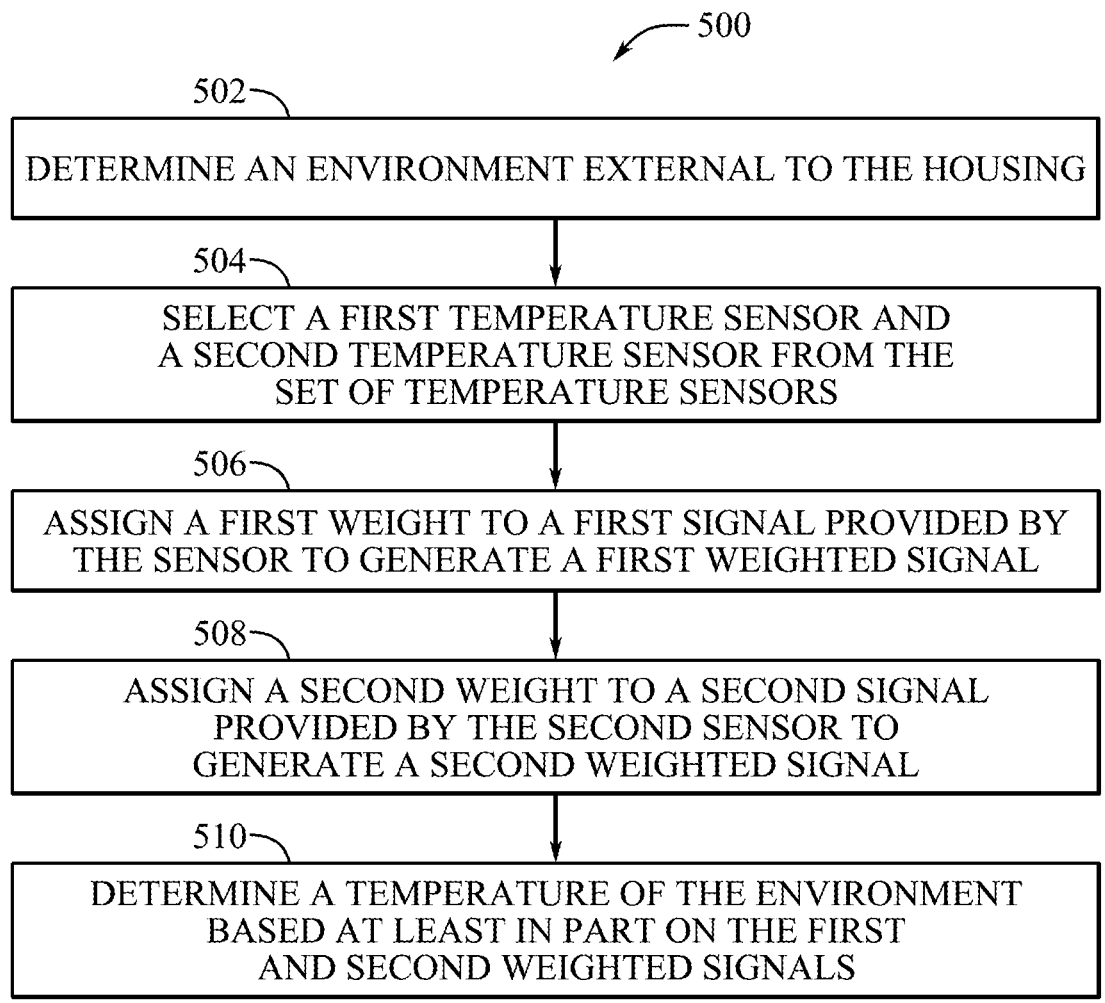
FIG. 3A shows a process flow diagram for detecting a temperature of an environment.

A more detailed disclosure relating to the operation and functionality of some examples of electronic devices are provided below with reference to FIGS. 3A-3C and 4. FIG. 3A shows an example of a process flow diagram implemented on an electronic device, such as, any one of the electronic devices previously described. The electronic device can be substantially similar to, and can include some or all of the features and/or components of the devices described herein, such as electronic devices 100, 200, 300, 400. For examples, the electronic device can include a housing defining an internal volume, a display assembly, a processor, a haptic engine, an electrical power supply, a set of temperature sensors, and/or any other component of the other electronic devices disclosed herein.

The processor can be disposed within the internal volume and can be communicatively coupled to the set of temperature sensors. The process 500 includes the act 502 of determining an environment external to the housing. The process 500 includes the act 504 of determining an adjustment factor correlating to the environment. The process 500 includes the act 506 of selecting a first sensor and a second sensor from the set of temperature sensors. The process 500 includes the act 508 of assigning a first weight to a first signal provided by the first sensor to generate a first weighted signal. The process 500 includes the act 510 of assigning a second weight to a second signal provided by the second sensor to generate a second weighted signal. The process 500 includes the act 512 of determining a temperature of the environment based on the adjustment factor and the first and second weighted signals.

Accordingly, the process 500 can be utilized to generate a predicted or estimated temperature of the environment external to the electronic device. The process 500 can include more or fewer acts than the acts 502-512. For example, the process 500 can optionally include acts which relate to selecting a third sensor; assigning a third weight to a third signal provided by the third sensor to generate a third weighted signal; and determining a temperature of the environment based on the adjustment factor and the first, second, and third weighted signals. In other words, some of the acts are optional, and therefore, need not be implemented to generate the predicted or estimated temperature of the environment external to the electronic device.

The process 500 includes the act 502 of determining an environment external to the housing. Determining the environment external to the housing can include determining the type of environment using one or more infrared sensors, humidity sensors, or other sensors communicatively coupled to the processor (e.g., main logic board) to determine the type of environment surrounding the electronic device 300. For example, the environment or type of environment can be determined to be aqueous, such as, when the electronic device is submerged under water.

The process 500 includes the act 504 of determining an adjustment factor correlating to the environment. The adjustment factor can be applied to a summation of the weighted temperature values to predict or estimate a temperature of the external environment. The adjustment factor can at least partially correlate to the environment surrounding the electronic device. For example, the adjustment factor can have a respective magnitude or value when the electronic device is surrounded by relatively dry air and a different magnitude or value when the portable electronic device is surrounded by a liquid (e.g., submerged in water). In some examples, the magnitude or size of the adjustment factor can be determined based on heat transfer characteristics or another relationship between the electronic device and the determined environment.

The process 500 includes the act 506 of selecting a first sensor and a second sensor from the set of temperature sensors. In some examples, the first and second sensors can be selected based on their positions within the housing. As described herein, machine learning techniques can be applied to a data set to determine which combinations of sensors can be relied upon to consistently generate the most accurate estimated temperature of the external environment. For example, signals from a sensor positioned adjacent a non-heat generating electrical component of the electronic device can be utilized to more consistently approximate an accurate external temperature. Alternatively, or additionally, the first and second sensors can be selected based on the value of the temperature measured by the particular sensor of the set of temperature sensors. For example, the machine learning techniques can generate models (i.e., combinations of sensors, weights, and an adjustment factor) which correlates a particular measured temperature at the sensor(s) with a particular temperature of the external environment.

The process 500 includes the act 508 of assigning a first weight to a first signal provided by the first sensor to generate a first weighted signal. The process 500 includes the act 510 of assigning a second weight to a second signal provided by the second sensor to generate a second weighted signal. The first and second weights can be scalers which are unique to a particular model being applied to estimate the temperature of the external environment. For example, machine learning techniques can be utilized to generate the first and second weights after analyzing the data set previously described. The first weight can be larger, equivalent, or smaller than the second weight. In some embodiments, the first and second weights can be representative of a confidence level associated with the first and second sensors, respectively. For example, the first weight applied to the first signal can be greater than the second weight applied to the second signal because machine learning techniques indicate the signals of the first sensor (i.e., a temperature sensor in a particular position within the electronic device) have a more consistent correlation with a particular type of environment. A magnitude or size of the first and second weights can be based on at least one of the environment external to the housing, a temperature detected by each of the first and second sensors, or respective positions within the internal volume of each of the first and second sensors.

The process 500 includes the act 512 of determining a temperature of the environment based on the adjustment factor and the first and second weighted signals. For example, the temperature of the environment can be determined by adding the first and second weighted signals and then subtracting the adjustment factor (or adding a negative adjustment factor) as shown in Equation 1. While the process 500 utilizes two sensors (the first and second sensors), those having skill in the art will readily appreciate that the process 500 can include less than two sensors or more than two sensors. For example, the process 500 can optionally include selecting a third sensor; assigning a third weight to a third signal provided by the third sensor to generate a third weighted signal; and determining a temperature of the environment based on the adjustment factor and the first, second, and third weighted signals.

Figure 3B:
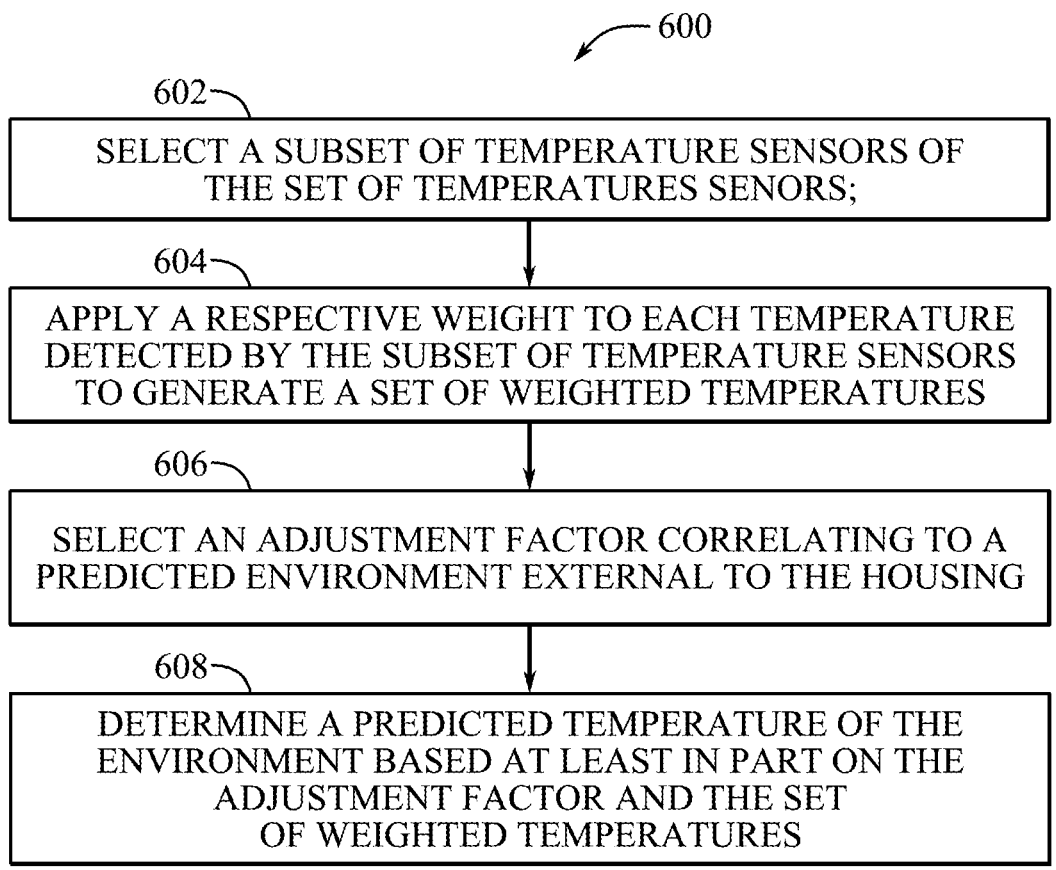
FIG. 3B shows a process flow diagram for detecting a temperature of an environment.

FIG. 3B shows an example of a process flow diagram implemented on an electronic device, such as, any one of the electronic devices previously described. The electronic device can be substantially similar to, and can include some or all of the features and/or components of the devices described herein, such as electronic devices 100, 200, 300, 400. For examples, the electronic device can include a housing defining an internal volume, a display assembly, a processor, a haptic engine, an electrical power supply, a set of temperature sensors, and/or any other component of the other electronic devices disclosed herein.

The processor can be disposed within the internal volume and communicatively coupled to the set of temperature sensors. The process 600 includes the act 602 of selecting a first subset of sensors of the set of temperature sensors. The process 600 includes the act 604 of applying a respective weight to each temperature detected by the first subset of sensors to generate weighted temperatures. The process 600 includes the act 606 of selecting a first adjustment factor correlating to a predicted environment external to the housing. The process 600 includes the act 608 of determining a first predicted temperature of the predicted environment based on the first adjustment factor and the weighted temperatures.

Accordingly, the process 600 can be utilized to generate a predicted or estimated temperature of the environment external to the electronic device. The process 600 can include more or fewer acts than the acts 602-608. For example, the process 600 may optionally include an act of evaluating the first predicted temperature. In other words, some of the acts are optional and therefore need not be implemented to generate the predicted or estimated temperature of the environment external to the electronic device.

The process 600 includes the act 602 of selecting a first subset of sensors of the set of temperature sensors. The first subset of sensors can be at least one sensor from the set of temperature sensors, for example, the subset can be a single sensor, two sensors, three sensors, or more than three sensors. The set of temperature sensors can be disposed within the electronic device and positioned on or adjacent various components of the electronic device, such as, a main logic board or processor, an electrical power supply, a barometric vent, a speaker module, a haptic engine, a display assembly, a wireless communication module, or any other component of the electronic device.

The process 600 includes the act 604 of applying a respective weight to each temperature detected by the first subset of sensors to generate weighted temperatures. Each of the respective weights can be a scaler which is unique to a particular model being applied to estimate the temperature of the external environment. For example, machine learning techniques can be utilized to generate the respective weights after analyzing the data set previously described. Each respective weight assigned to a sensor can be larger, equivalent, or smaller than another respective weight assigned to another sensor. A magnitude or size of the respective weights can be based on at least one of the predicted environment, a temperature detected by each respective sensor of the first subset of sensors, or respective positions within the internal volume of each sensor of the first subset of sensors.

The process 600 includes the act 606 of selecting a first adjustment factor correlating to a predicted environment external to the housing. The first adjustment factor can at least partially correlate to the environment surrounding the electronic device. For example, the first adjustment factor can have a respective magnitude or value when the electronic device is surrounded by relatively dry air and a different magnitude or value when the portable electronic device is surrounded by a liquid (e.g., submerged in water). In some examples, the magnitude or size of the first adjustment factor can be determined based on heat transfer characteristics or another relationship between the electronic device and the determined environment.

The process 600 includes the act 608 of determining a first predicted temperature of the predicted environment based on the first adjustment factor and the weighted temperatures.

For example, the first predicted temperature of the predicted environment can be determined by adding the weighted temperatures of act 604 and then subtracting the first adjustment factor (or adding a negative adjustment factor) as shown in Equation 1.

In some examples, the process 600 can include evaluating the first predicted temperature. For example, the first predicted temperature can be compared to a range of expected temperature values. If the first predicted temperature falls within the range of expected temperature values, the first predicted temperature can be confirmed or validated. However, if the first predicted temperature falls outside of the range of expected temperature values (e.g., above or below the range), the process 600 can include modifying at least one of the first subset of sensors, the respective weights, or the first adjustment factor and then repeating the determination or calculation of the predicted temperature. For example, if the first predicted temperature falls outside of the range of expected temperature values, the process 600 can include selecting a second subset of sensors of the set of temperature sensors; applying a respective weight to each temperature detected by the second subset of sensors to generate alternate weighted temperatures; and determining a second predicted temperature of the environment based on the first adjustment factor and the alternate weighted temperatures.

In some examples, if the first predicted temperature falls outside of the range of expected temperature values, the process 600 can include selecting a second adjustment factor correlating to the predicted environment external to the housing and determining a second predicted temperature of the environment based on the second adjustment factor and the weighted temperatures. In some examples, if the first predicted temperature falls outside of the range of expected temperature values, the process 600 can include selecting a second subset of sensors of the set of temperature sensors; applying a respective weight to each temperature detected by the second subset of sensors to generate alternate weighted temperatures; selecting a second adjustment factor correlating to the predicted environment external to the housing; and determining a second predicted temperature of the environment based on the second adjustment factor and the alternate weighted temperatures.

In some examples, at least one of the respective weights or the adjustment factor can be determined or selected based on calibration data communicated to the electronic device from an ancillary electronic device. For example, the electronic device can be communicatively coupled to one or more ancillary electronic devices and receive calibration data, such as, temperature data, location data, sensor data, or any other data relating to the geographic location of the electronic device or the electronic device itself. In other words, the calibration data can be crowd-sourced from one or more ancillary electronic devices in communication with the electronic device. The calibration data can be received by the electronic device before the temperature estimation process (e.g., process 500, 600) begins or while the process is currently underway. The electronic device can be communicatively coupled to the one or more ancillary electronic devices via a wired or a wireless connection, for example, a cable interconnecting the two devices or a wireless protocol such as IEEE 802 (i.e., Bluetooth and Wi-Fi wireless networking technologies). Any other method for communicatively coupling the electronic device with the one or more ancillary electronic devices is also contemplated within this disclosure, such as, a USB based connection, and other wired connections.

Figure 3C:
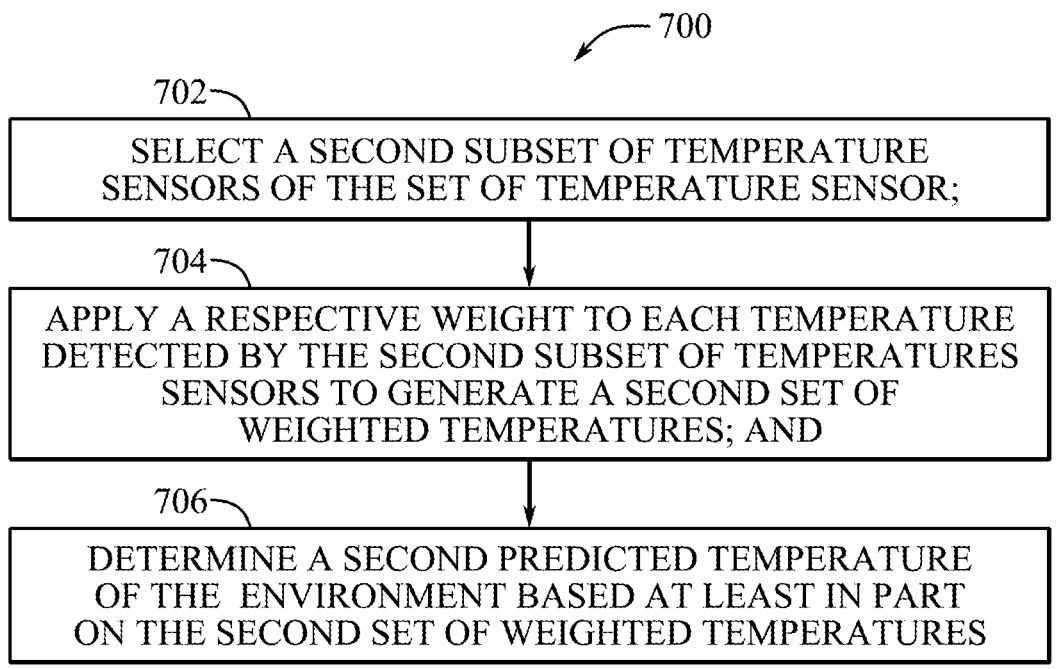
FIG. 3C shows a process flow diagram for detecting a temperature of an environment.

FIG. 3C shows an example of a process flow diagram that can be implemented on an electronic device, for example, following the process 600 described above, or concurrently therewith. Thus, the processes 600 and 700 can be carried out in series, or in parallel. The additional process 700 includes the act 702 of selecting a second, different subset of sensors of the set of temperature sensors. The second subset of sensors can be at least one sensor from the set of temperature sensors, for example, the subset can be a single sensor, two sensors, three sensors, or more than three sensors. The set of temperature sensors can be disposed within the electronic device and positioned on or adjacent various components of the electronic device, such as, a main logic board or processor, an electrical power supply, a barometric vent, a speaker module, a haptic engine, a display assembly, a wireless communication module, or any other component of the electronic device.

The process 700 includes the act 704 of applying a respective weight to each temperature detected by the second subset of sensors to generate weighted temperatures. Each of the respective weights can be a scaler which is unique to a particular model being applied to estimate the temperature of the external environment. For example, machine learning techniques can be utilized to generate the respective weights after analyzing the data set previously described. Each respective weight assigned to a sensor can be larger, equivalent, or smaller than another respective weight assigned to another sensor. A magnitude or size of the respective weights can be based on at least one of the predicted environment, a temperature detected by each respective sensor of the second subset of sensors, or respective positions within the internal volume of each sensor of the second subset of sensors.

The process 700 includes the act 706 of determining a second predicted temperature of the predicted environment based on an adjustment factor and the weighted temperatures. The adjustment factor can be the same as the first adjustment factor of process 600, or can be another selected adjustment factor. The second adjustment factor can be selected to correlate to a different predicted environment external to the housing. For example, the second predicted temperature of the predicted environment can be determined by adding the weighted temperatures of act 704 and then subtracting the first or second adjustment factor (or adding a negative adjustment factor) as shown in Equation 1.

Figure 4:
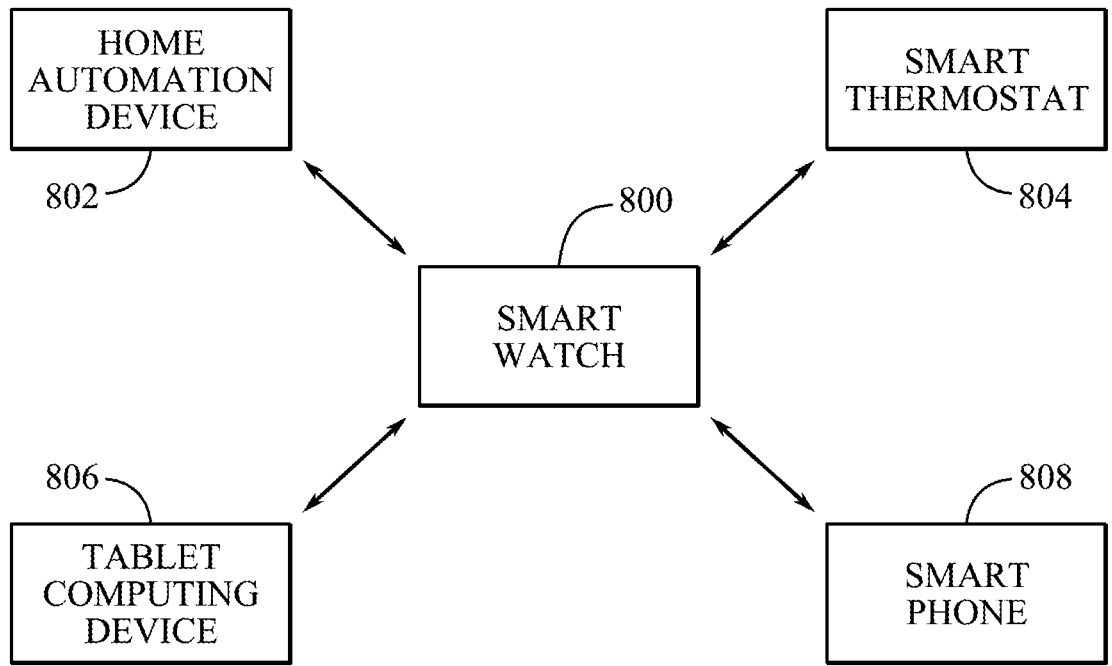
FIG. 4 shows a block diagram of a system capable of detecting a temperature of an environment.

As shown in the block diagram illustrated in FIG. 4, the electronic device can be a smartwatch 800 or another portable electronic device which is communicatively coupled to one or more ancillary electronic devices. The ancillary electronic devices can be any stationary or portable electronic devices, for example, a home automation device 802, a smart thermostat 804, a tablet computing device 806, a smartphone 808, or any other electronic device. In some examples, the smartwatch 800 can receive calibration data including a weather forecast for a geographic location at which the smartwatch 800 is located. The weather forecast can include current and future temperatures of the geographic location, humidity data, annual average temperatures for a particular day or period of time, and/or other weather related information.

Any number or variety of components in any of the configurations described herein can be included in an electronic device, as described herein. The components can include any combination of the features described herein, and can be arranged in any of the various configurations described herein. The structure and arrangement of components of a device, as well as the concepts regarding their use can apply not only to the specific examples discussed herein, but to any number of embodiments in any combination. Various examples of operational aspect and functionality of the electronic devices and electronic device components are described below, with reference to FIG. 5.

Figure 5:
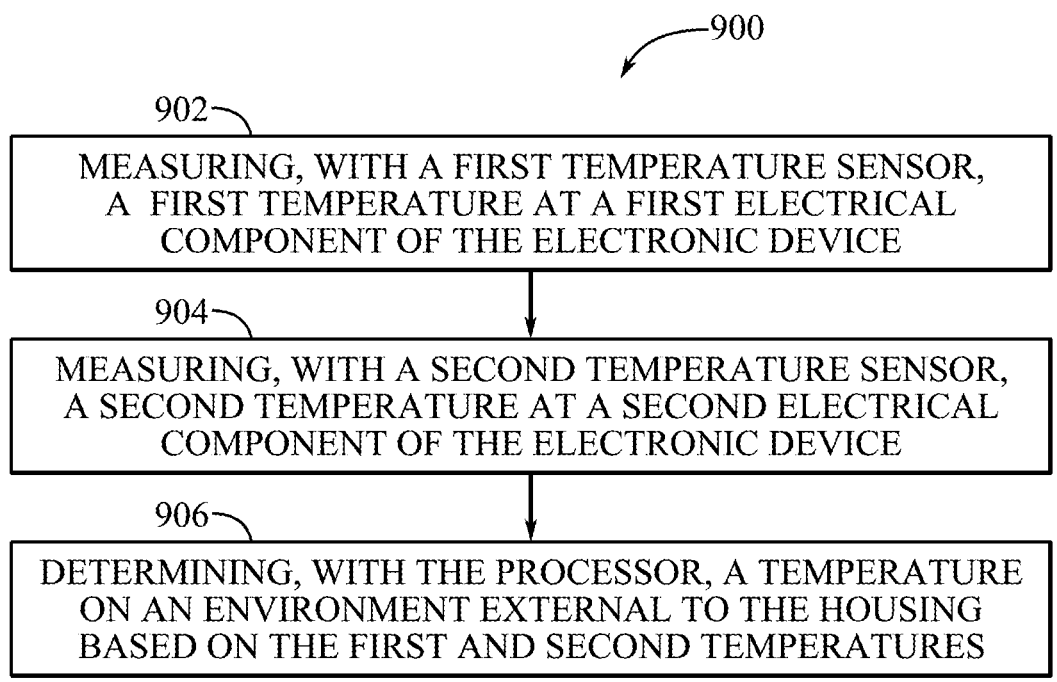
FIG. 5 shows a process flow diagram for detecting a temperature of an environment.

FIG. 5 shows an example of a process flow diagram implemented on an electronic device, such as, any one of the electronic devices previously described. The electronic device can be substantially similar to, and can include some or all of the features and/or components of the devices described herein, such as electronic devices 100, 200, 300, 400. For example, the electronic device can include a housing at least partially defining an internal volume, a display assembly, a processor, a haptic engine, an electrical power supply (e.g., a battery), one or more temperature sensors, and/or any other component of the other electronic devices disclosed herein.

The process 900 includes the act 902 of measuring, with a first temperature sensor, a temperature at a first electrical component of the electronic device. The process 900 includes the act 904 of measuring, with a second temperature sensor, a temperature at a second electrical component of the electronic device. The process 900 includes the act 906 of determining, with the processor, a temperature of an environment external to the housing based on an adjustment factor and the temperatures measured by the first and second temperature sensors.

Accordingly, the process 900 can be utilized to generate a predicted or estimated temperature of the environment external to the housing of the electronic device. The process 900 can include more or fewer acts than the acts 902-906. For example, the process 900 may optionally include an act of weighting the respective temperatures measured by the first and second temperature sensors. In other words, some of the acts are optional and therefore need not be implemented to generate the predicted or estimated temperature of the environment external to the housing of the electronic device.

The process 900 includes the act 902 of measuring, with a first temperature sensor, a temperature at a first electrical component of the electronic device. The process 900 includes the act 904 of measuring, with a second temperature sensor, a temperature at a second electrical component of the electronic device. The first and second temperature sensors can be thermistors, such as, negative temperature coefficient thermistors (NTC), positive temperature coefficient thermistors (PTC), resistance temperature detectors, thermocouples, or another type of thermistor. The first and second electrical components can be any combination of components of the electronic device, for example, a haptic engine, an electrical power supply, a speaker module, and a logic board or processor, a display component, a wireless communication module, a user interface, a backlight, or any other components disposed within portable electronic devices.

The process 900 includes the act 906 of determining, with the processor, a temperature of an environment external to the housing based on an adjustment factor and the temperatures measured by the first and second temperature sensors. For example, the temperature of the environment can be determined by weighting temperatures measured by the first and second temperature sensors, adding the weighted temperatures, and subtracting the adjustment factor (or adding a negative adjustment factor) as shown in Equation 1. The adjustment factor can be at least partially based on the type of environment surrounding the electronic device. For example, the adjustment factor can have a respective magnitude or value when the electronic device is surrounded by a dry or arid environment and a different magnitude or value when the portable electronic device is surrounded by a humid or aqueous environment (e.g., submerged in water).

In some examples the first and/or second electrical component can receive electrical power from the electrical power supply (e.g., a battery). While powered by the electrical power supply, the first and/or second electrical component can generate heat during operation. For example, a logic board or processor can generate heat while operating. This additional heat can influence or vary the temperature proximate to the electrical component measured by the first and/or second temperature sensor. In some examples, the temperature measured at the first and/or second temperature sensor can be weighted to mitigate an inaccurate determination of the temperature external to the electronic device. Additionally, or alternatively, a magnitude or size of the adjustment factor can be selected which compensates for heat generated within the housing of the electronic device.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A portable electronic device, comprising:
a housing defining an internal volume;
a display assembly attached to the housing;
a set of temperature sensors disposed in the internal volume; and
a processor disposed in the internal volume, the processor connected to the set of temperature sensors, the processor configured to:
   determine a type of an environment external to the housing;
   select a first temperature sensor and a second temperature sensor from the set of temperature sensors;
   assign, based on the type of the environment, a first weight to a first signal provided by the first temperature sensor to generate a first weighted signal;
   assign, based on the type of the environment, a second weight to a second signal provided by the second temperature sensor to generate a second weighted signal; and
   determine a temperature of the environment based at least in part on the first and second weighted signals.

2. The portable electronic device of claim 1, wherein the first temperature sensor and the second temperature sensor are selected from the set of temperature sensors based at least in part on the type of the environment.

3. The portable electronic device of claim 1, wherein:
the processor is further configured to determine an adjustment factor corresponding to the type of the environment; and
determining the temperature of the environment is based at least in part on the adjustment factor.

4. The portable electronic device of claim 1, wherein:
the first temperature sensor is positioned adjacent a first internal component; and
the second temperature sensor is positioned adjacent a second, different internal component.

5. The portable electronic device of claim 1, wherein:
a magnitude of the first weight is based on at least one of the first signal or a position of the first temperature sensor within the internal volume; and
a magnitude of the second weight is based on at least one of the second signal or a position of the second temperature sensor within the internal volume.

6. The portable electronic device of claim 1, wherein the type of the environment includes at least one of an arid environment, a humid environment, or an aqueous environment.

7. The portable electronic device of claim 1, wherein at least one of the first temperature sensor or the second temperature sensor is affixed to the display assembly.

8. The portable electronic device of claim 1, wherein at least one of the first weight, the second weight, or an adjustment factor is determined by a machine learning algorithm.

9. A portable electronic device, comprising:
a housing defining an internal volume;
a set of temperature sensors disposed in the internal volume; and
a processor disposed in the internal volume and connected to the temperature sensors, the processor configured to:
   determine an environment type for an environment external to the housing;
   select a subset of temperature sensors from the set of temperature sensors;
   apply a respective weight to each temperature detected by the subset of temperature sensors to generate a set of weighted temperatures;
   select an adjustment factor corresponding to the environment type; and
   determine an estimated temperature of the environment based at least in part on the adjustment factor and the set of weighted temperatures.

10. The portable electronic device of claim 9, wherein each respective weight is based on at least one of the environment type, a temperature detected by a temperature sensor of the subset of temperatures sensors, or respective positions within the internal volume of each temperature sensor of the subset of temperature sensors.

11. The portable electronic device of claim 9, wherein the environment type comprises at least one of an arid environment in which ambient air at least partially surrounds the housing or an aqueous environment in which water at least partially surrounds the housing.

12. The portable electronic device of claim 9, wherein:
the environment type for the environment comprises a first environment type for a first environment;
the subset of temperature sensors comprises a first subset of temperature sensors;
the set of weighted temperatures comprises a first set of weighted temperatures;
the estimated temperature comprises a first estimated temperature; and
the processor is further configured to:
   determine a second environment type for a second environment external to the housing;
   select a second subset of temperature sensors of the set of temperature sensors based on the second environment type;
   apply a respective weight to each temperature detected by the second subset of temperatures sensors to generate a second set of weighted temperatures; and
   determine a second estimated temperature of the second determined environment based at least in part on the second set of weighted temperatures.

13. The portable electronic device of claim 12, wherein:
the adjustment factor comprises a first adjustment factor; and
the processor is further configured to:
   select a second adjustment factor corresponding to the second environment type;
   wherein determining the second estimated temperature of the second environment is further based at least in part on the second adjustment factor.

14. The portable electronic device of claim 9, wherein at least one of the respective weights or the adjustment factor is at least partially determined based on calibration data communicated to the processor by an ancillary electronic device.

15. The portable electronic device of claim 14, wherein the ancillary electronic device comprises a smart thermostat, a smartphone, a smart watch, or a tablet computing device.

16. The portable electronic device of claim 14, wherein the ancillary electronic device comprises an assembly device.

17. An electronic device, comprising:
a housing at least partially defining an internal volume;
a first electrical component disposed in the internal volume;
a first temperature sensor positioned proximate to the first electrical component and configured to measure a first temperature at the first electrical component;
a second electrical component disposed in the internal volume;
a second temperature sensor positioned proximate to the second electrical component and configured to measure a second temperature at the second electrical component; and
a processor connected to the first temperature sensor and the second temperature sensor, the processor configured to:
determine a type of environment external to the housing;
determine an estimated temperature of the environment external to the housing based at least in part on;
a set of weighted temperatures including the first temperature and the second temperature; and
an adjustment factor corresponding to the type of environment external to the housing.

18. The electronic device of claim 17, wherein at least one of the first temperature sensor or the second temperature sensor comprises a negative temperature coefficient thermistor, a positive temperature coefficient thermistor, a resistance temperature detector, or a thermocouple.

19. The electronic device of claim 17, wherein:
the electronic device further comprises a power supply; and
the first temperature increases when the first electrical component is being supplied electrical power by the power supply.

20. The electronic device of claim 17, wherein the first electrical component comprises a display assembly, a battery, a speaker, or an antenna.

* * * * *